Figure 1:
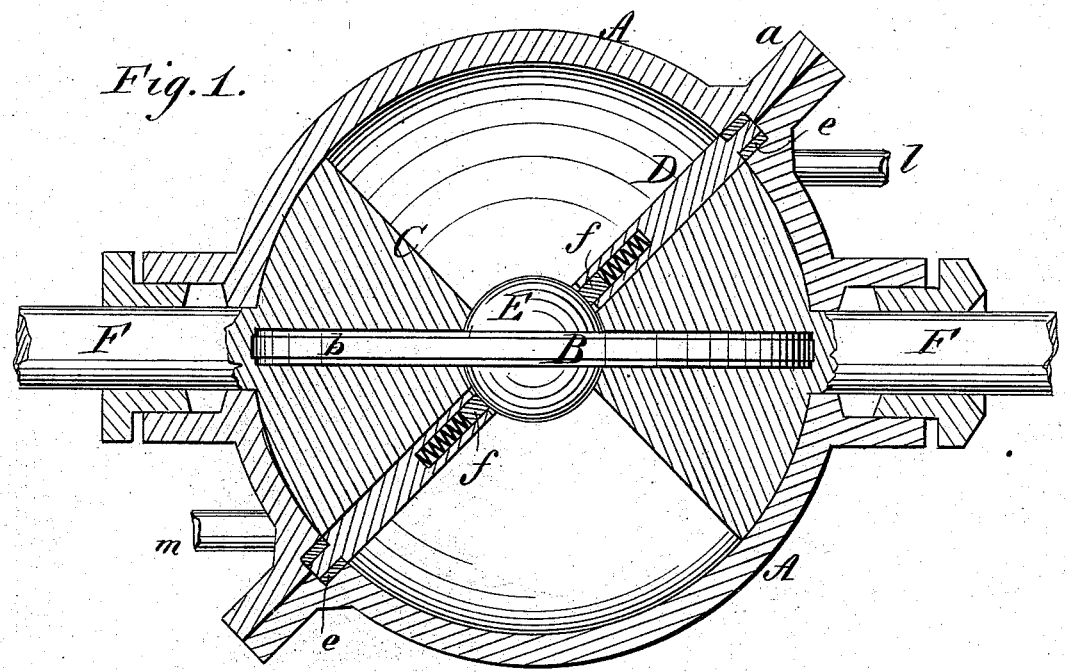

(Model.)

J. T. DAVIS.
ROTARY ENGINE.

No. 295,859. Patented Mar. 25, 1884.

WITNESSES:
Donn Twitchell.
C. Sedgwick.

INVENTOR:
J. T. Davis
BY Munn & Co
ATTORNEYS.

UNITED STATES PATENT OFFICE.

JOHN T. DAVIS, OF NEW YORK, N. Y.

ROTARY ENGINE.

SPECIFICATION forming part of Letters Patent No. 295,859, dated March 25, 1884.

Application filed November 28, 1882. (Model.)

*To all whom it may concern:*

Be it known that I, JOHN T. DAVIS, of the city, county, and State of New York, have invented a new and useful Improvement in Rotary Engines, of which the following is a full, clear, and exact description.

My invention consists in a rotary engine in which are employed two hemispheres and two cones, the cones having faces that present radial lines from the center or apex of the cone to the outside periphery, while the back side of the cone forms a circle, the radius of which corresponds to the size of the hemisphere employed. The cones are situated in the spheres with the points or apex of the cones touching in the center of the spheres, and having a slot cut through their centers to admit of the piston. I employ a circular and solid piston packed on the periphery with a ring of metal set out against the circle of the sphere to make a steam-tight joint. The center of this piston is provided with a circular hub, that fits into the circular space turned out of the point of the cone to the size of the hub, to more effectually make a steam-tight joint at that point of contact. I employ a disk larger in diameter than the diameter of the sphere, allowing the extension to work in a groove turned out of the spheres immediately under the flanges, by which it is kept in its exact position as it rotates on an axis at an angle to the axis of the piston. This disk has a slot cut through it the length of the diameter of the sphere, leaving the outer rim solid to work into the groove referred to. Through this slot the piston passes, fitting it sufficiently accurate to make a steam-tight joint. There is also a circular hole cut to fit the spherical hub on the piston. Around this hub in the disk packing is inserted to make a tight joint. This disk is placed at an angle of inclination equal to one-fourth of the circle of the sphere and against the faces of the two cones, making a joint at the point of contact on one cone, and a joint at the point of contact on the opposite side of the disk with the other cone, thus dividing the spherical chamber into two crescent-shaped compartments, and forming a steam-chamber on each side, making the engine double-acting. The disk being placed through a central line of the sphere, and the shafts attached at each side, the shafts passing through the case of the hemisphere, and a stuffing-box on the outside of the case, the disk is kept in a permanent position and revolves upon its axis and plane produced by the line of axes of the two shafts. The disk situated at an angle of one-quarter from a perpendicular in its motion around the axis of the piston describes a circle diagonal to a vertical plane, and in doing so passes across the face of the piston from one side to the other, at the same time traveling in its own plane, while the circular hole is fitted to the globe on the piston and passes around it from one side to the other.

In its workings under the pressure of steam the rationale of the operation would be as follows: Steam, entering at the point where the chamber is being formed by the passage of the piston through the angling disk and the cone, acts against the bulk-head thus formed by the junction of the disk and the cone, and forces the piston around the sphere, which gives motion to the shafts. At the largest area of the steam-chamber the steam is cut off by the other half of the piston passing through the same point, the operation having been repeated by the cone and disk on the opposite side of the disk. By this device I secure a piston-area equal to one-half of the whole piston.

The working of steam expansively can be accomplished by putting a steam-chest on the case and working a slide-valve and an eccentric on the shaft, and can be made reversible by the ordinary link-motion.

The cones are held in their position by being attached to the shafts on the back side, which position also keeps the piston in its central position.

Figure 2:
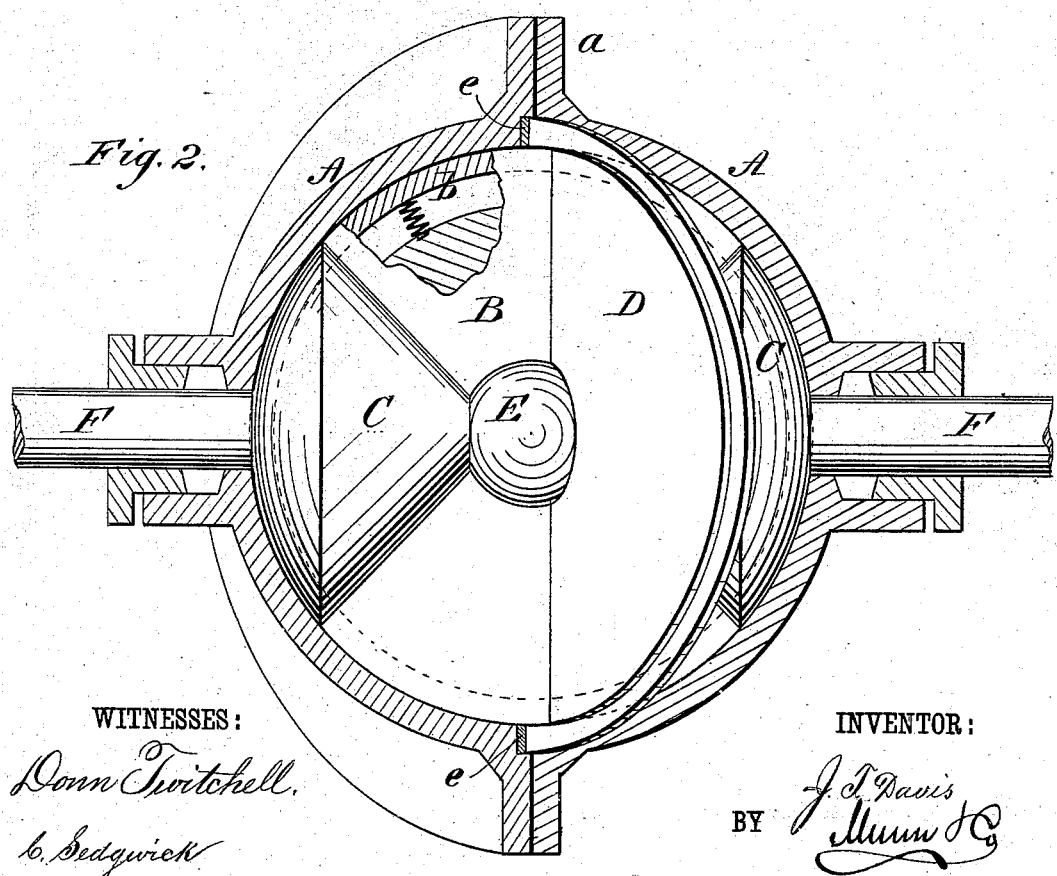

The details of construction are as follows:

Reference being had to the accompanying drawings, forming part of this specification, in which similar letters of reference indicate corresponding parts in both the figures, Figure 1 is a transverse section of my improved engine. Fig. 2 is a transverse section at right angles to Fig. 1.

A A are the two hemispheres, united by flanges $a$.

B is the circular piston, fitting the interior of the sphere and provided in its rim with a packing-ring, b.

C C are the two cones, divided or slotted in the plane of their axes to receive the piston B; and D is the diaphragm, which is also slotted transversely, to allow the piston to pass through it, the edges of the disk entering grooves e, formed in the sphere, being solid and fitted with packing.

E is a ball or globe formed at the center of the piston, against which the apices of the cones are fitted. The center portion of the disk D is also shaped to fit the ball E, and is fitted with packings f, so as to form a tight joint.

F F are the shafts passing through suitable stuffing-boxes at opposite sides of the sphere and slotted at their inner ends, so as to receive and carry the piston B. The two halves of each cone are attached to the shafts, and the bases of the cones being convex they fit closely, so that the parts are all held in place when the hemispheres are connected.

l and m are the inlet and outlet ports, of which there are two of each.

The disk being passed into the cover of case, the former is confined to the surface of the cone, so as to make a bulk-head against which the steam may act, and be confined to the line of its orbit. The entering steam impinges against the bulk-head formed by the junction of the disk and cone and forces the piston round the sphere, so as to give motion to the shafts and make the engine double-acting. The piston, being provided with a movable joint passing through the disk, is thus allowed to vibrate out of a line of true curvature. The advantage of combining a disk and piston on different axes with cones arranged in a line central to the shaft is that not only may motion be thereby given to the shafts, but an adjustment of the hemispheres allowed, so as to preserve the requisite degree of tightness.

Having thus described my invention, I claim as new and desire to secure by Letters Patent—

1. The combination of the sphere A, cones C C, the piston B, and the shafts F F, all acting upon a common axis through the center of the sphere, and revolving upon a common center with the disk D, having a larger diameter than the internal diameter of the sphere, a slot of the exact diameter of the piston B, and a circular central aperture fitting the globe E of the piston B, and provided with packing f, which piston is set at an angle from a perpendicular, and the inlet and outlet passages l m, all of said parts being arranged substantially as shown, and for the purposes set forth.

2. The disk with a slot through its center and a circular aperture fitting the globe on the piston, through which the piston works in its revolutions around its axis, supported and kept in position by an outside ring or flange working in a groove turned in the case of the sphere at the point where the flanges come together.

JNO. T. DAVIS.

Witnesses:
GEO. D. WALKER,
C. SEDGWICK.